United States Patent [19]

Sheehan et al.

[11] Patent Number: 5,000,412
[45] Date of Patent: Mar. 19, 1991

[54] TACKLE BOX HOLDER

[75] Inventors: Larry A. Sheehan, Springfield; John R. James, Cassville, both of Mo.

[73] Assignee: Bo-James Co., Inc., Cassville, Mo.

[21] Appl. No.: 464,931

[22] Filed: Jan. 16, 1990

[51] Int. Cl.$^5$ .............................................. A01K 97/06
[52] U.S. Cl. ..................................... 248/286; 248/293
[58] Field of Search ........................ 248/286, 293, 326

[56] References Cited

U.S. PATENT DOCUMENTS

| | | | |
|---|---|---|---|
| 837,642 | 12/1906 | Powell | 248/286 |
| 1,908,136 | 5/1933 | Fox | 248/286 |
| 2,135,145 | 11/1938 | Reed | 248/286 |
| 2,776,757 | 1/1957 | Schoenlaub | 248/286 |
| 3,304,036 | 2/1967 | Davis | 248/286 |
| 4,695,025 | 9/1987 | Vaughan | 248/293 |
| 4,844,390 | 7/1989 | Duke | 248/286 |

*Primary Examiner*—Reinaldo P. Machado
*Attorney, Agent, or Firm*—Senniger, Powers, Leavitt & Roedel

[57] ABSTRACT

A tackle box holder of the present invention comprises an elongate support member, a bracket for pivotally connecting one end of the support member to the pedestal of a boat seat for swinging movement of the support member on a first generally horizontal axis, and a mounting structure at the other end of the support member for mounting a tackle box for pivotal movement of the box on a second generally horizontal axis extending in side-to-side direction with respect to the tackle box. The support member, when pivotally connected to the pedestal of a boat seat, pivots on the first generally horizontal axis between a lowered position in which a tackle box mounted on the support member is adapted to rest on a supporting surface, such as a boat deck, and a raised position in which the tackle box is adapted to rest on the lap of a person sitting in the boat seat.

12 Claims, 1 Drawing Sheet

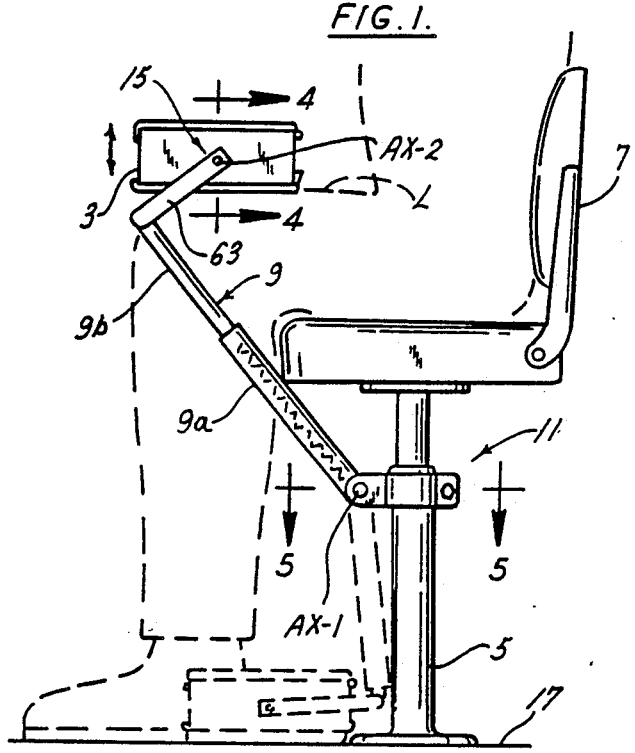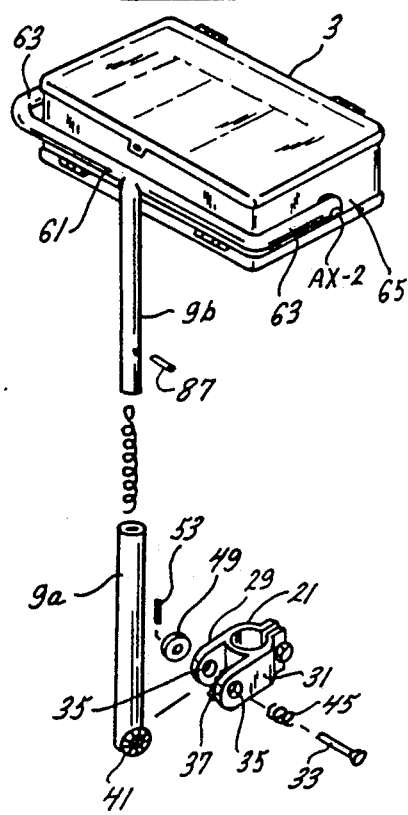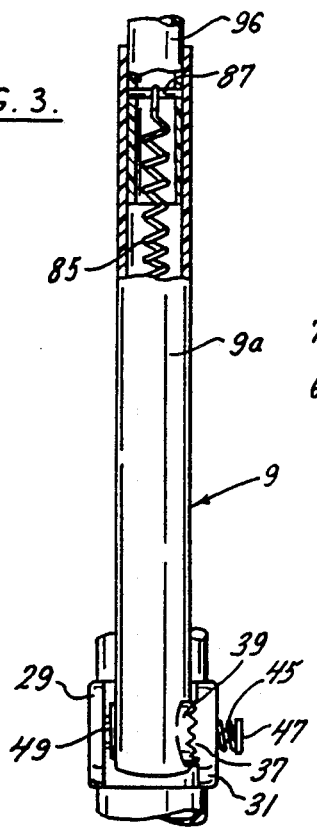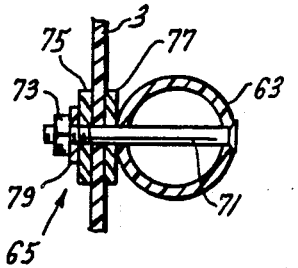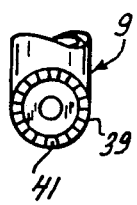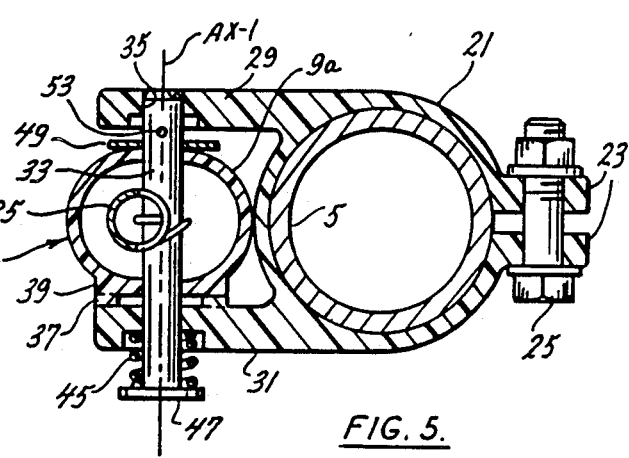

TACKLE BOX HOLDER

BACKGROUND OF THE INVENTION

This invention relates generally to fishing equipment and, more particularly, to a device for holding a tackle box for fishing gear.

Bass fishing has become increasingly popular in recent years. One of the problems associated with bass fishing in bass boats is the problem of finding and handling a tackle box while fishing. Thus, the replacement of a lure typically involves getting off of the seat in the boat, finding the tackle box, taking the necessary equipment from the tackle box, and then getting back on the seat, all of which is often inconvenient, especially at night when visibility is poor. Accordingly, there is a need for a device which holds a tackle box and enables it conveniently to be used while remaining seated on the boat seat.

SUMMARY OF THE INVENTION

Among the several objects of this invention may be noted the provision of a tackle box holder which is adapted to be mounted on the pedestal of a boat seat, for example, for convenient access to the tackle box while remaining seated on the boat seat; the provision of such a holder which permits the tackle box to lie flat on the boat deck or on the lap of a person sitting on the boat seat; the provision of such a holder which is designed to securely hold a tackle box on the lap of a person sitting on the boat seat, thereby enabling the person to use both hands for other activities; the provision of such a holder which permits the tackle box to pivot on an axis extending in side-to-side direction with respect to the box to permit ready access to the top or bottom compartments in the box; the provision of such a holder which is adjustable to hold the box at various angular positions relative to person sitting on the boat seat; and the provision of such a holder which is relatively simple in design for economical manufacture.

Generally, a tackle box holder of the present invention comprises an elongate support member, connecting means for pivotally connecting one end of the support member, constituting its inner fixed end, to the pedestal of a boat seat for swinging movement of the support member on a first generally horizontal axis, and mounting means adjacent the other end of the support member, constituting its outer movable end, for mounting a tackle box for pivotal movement of the box on a second generally horizontal axis extending in side-to-side direction with respect to the tackle box. The support member, when pivotally connected to the pedestal of a boat seat, is adapted to pivot on said first generally horizontal axis between a lowered position in which a tackle box mounted on the support member is adapted to rest on a supporting surface, such as a boat deck, and a raised position in which the tackle box is adapted to rest on the lap of a person sitting in the boat seat.

Other objects and features will be in part apparent and in part pointed out hereinafter.

BRIEF DESCRIPTION OF THE DRAWINGS

FIG. 1 is a side elevational view of a tackle box holder of the present invention mounted on the pedestal of a boat seat;

FIG. 2 is an exploded view of the holder;

FIG. 3 is an enlarged view of a support member of the holder, parts of the support member being broken away to illustrate details;

FIG. 4 is an enlarged vertical section on line 4—4 of FIG. 1 showing how the tackle box is mounted on the holder;

FIG. 5 is an enlarged horizontal section on line 5—5 of FIG. 1; and

FIG. 6 is a view of a portion of FIG. 2.

Corresponding parts are indicated by corresponding reference numerals throughout the several views of the drawings.

DESCRIPTION OF THE PREFERRED EMBODIMENT

Referring now to FIG. 1 of the drawings, a tackle box holder of the present invention, designated in its entirety by the reference numeral 1, is shown mounting a tackle box 3 on the pedestal 5 of a boat seat 7 in a bass boat, for example. As illustrated, the holder 1 comprises an elongate tubular support member, generally indicated at 9, connecting means generally designated 11 for pivotally connecting one end of the support member, constituting its inner fixed end, to the pedestal for swinging movement of the support member in a vertical plane on first generally horizontal axis AX-1, and mounting means generally designated 15 at the other end of the tubular support member 9, constituting its outer movable end, for mounting the tackle box 3 for pivotal movement of the box on a second generally horizontal axis AX-2 extending in side-to-side direction with respect to the box. The arrangement is such that the tubular support member 9, as pivotally connected to the pedestal 5, is adapted to be pivoted on axis AX-1 between a lowered position (shown in phantom lines in FIG. 1) in which the tackle box rests on a supporting surface 17, such as the boat deck, and a raised position (shown in solid lines) in which the tackle box is adapted to rest on the lap L of a person sitting on the boat seat.

More specifically, connecting means 11 comprises a cylindric bracket 21 formed with a pair of generally parallel clamping flanges 23 which are adapted to be drawn together by a bolt 25 to clamp the bracket on the pedestal at a selected height. Extending from the bracket on the side of the bracket opposite flanges 23 are first and second generally parallel mounting arms indicated at 29 and 31. The inner (fixed) end of the tubular support member is received between these mounting arms 29, 31 and pivoted on a pivot pin 33 which extends diametrically through the support member and through openings 35 in the mounting arms 29, 31, the arrangement being such that the support member 9 pivots on the pivot pin 33 about axis AX-1. It will be noted that the spacing between the mounting arms 29, 31 is greater than the diameter of the tubular support member 9 to permit lateral movement of the support member between the mounting arms 29, 31 for reasons which will become apparent.

The bracket 21 further comprises a ratchet mechanism (constituting locking means) for releasably locking the support member 9 in its raised and lowered positions and various positions of angular adjustment therebetween. The ratchet mechanism includes a pair of annular ratchet members 37, 39 disposed in opposing relation on mounting arm 31 and the inside face of support member 9. The ratchet members 37, 39 have ratchet teeth 41 thereon and are movable toward one another (by lateral movement of the support member 9 toward mounting arm 31) to bring the teeth on the ratchet members into locking interengagement to lock the support member in a selected angular position, and away from one another (by lateral movement of the support member away from mounting arm 31) to move the teeth out of interengagement to permit the support member to be pivoted on axis AX-1 to a selected angular position. The ratchet members are biased or urged toward one another by a spring 45 interposed between the mounting arm 31 and a head 47 on the pivot pin 33. A collar 49 on the pivot pin between the support member 9 and mounting arm 29 abuts against the support member 9 to prevent relative movement between the support member and the pivot pin. The collar is held in place by a locking pin 53 extending radially through the pivot pin.

Mounting means 15 comprises a cross member 61 attached to the support member 9 at its outer end and extending generally parallel to axis AX-2, a pair of generally parallel arms, each designated 63, extending from opposite ends of the cross member, and pivot means, generally designated 65, at the outer ends of the arms 63 adapted for pivotally connecting the arms to opposite side walls of the tackle box 3 for pivoting (rotating) of the tackle box on axis AX-2. The spacing between the arms 63 will depend on the width of the particular tackle box. It is contemplated that the cross member 61 may be axially adjustable to vary the spacing between the arms to accommodate tackle boxes of different widths.

As illustrated in FIG. 4, pivot means 65 comprises a pivot member in the form of a bolt 71 extending through each arm 63 and a respective side wall of the tackle box 3, a nut 73 tightened on the bolt, and washers 75 and 77 positioned between the nut, side wall and arm. A suitable lock washer 79 may also be provided. The bolts 71 through the side walls of the tackle box are coaxial with axis AX-2 so that the tackle box pivots freely on this axis to ensure that it remains in a generally horizontal plane as the support member 9 is swung between its raised and lowered positions, and to ensure that the tackle box seats flat on the lap L of a person in chair 7 and flat on the deck 17. The fact that the tackle box is pivoted on the arms 63 is also advantageous in that the box may be rotated to top-up and bottom-up positions for ready access to top and bottom compartments in the box.

In accordance with another aspect of this invention, the support member 9 is extensible and retractible to vary the distance between mounting means 15 and the fixed inner end of the support member. To this end, the support member comprises a plurality of tubular sections 9a, 9b having a telescopic interfit. Two such sections are shown, an inner section 9a and an outer section 9b telescopically received in the inner section 9a. A spring 85 (constituting spring means) extends axially within the support member 9 and is releasably connected at one end to pivot pin 33 and at its other end to a pin 87 adjacent the inner end of the outer section 9b. Spring 85 is resiliently stretchable to permit limited extension of the tubular sections 9a, 9b relative to one another while resisting complete separation of the sections. The spring also urges the outer section 9b toward a retracted position within the inner section 9a (as depicted in phantom in FIG. 1), the arrangement being such that when the support member 9 is swung up and the outer section extended to place the tackle box on the lap of a person in the boat chair, the tackle box is drawn by the spring 85 against the lap of a person in the boat seat 5. This stabilizes the box on the lap without the need to hold it, thereby leaving both hands free for other activities.

The outer tubular section 9b of the support member 9, the cross member 61 and the arms 63 are preferably integrally formed of a suitably strong material (e.g., molded plastic).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A tackle box holder comprising
   an elongate support member,
   connecting means for pivotally connecting one end of the support member, constituting its inner fixed end, to the pedestal of a boat seat for swinging movement of the support member on a first generally horizontal axis; and
   mounting means adjacent the other end of the support member, constituting its outer movable end, for mounting a tackle box for pivotal movement of the box on a second generally horizontal axis extending in side-to-side direction with respect to the tackle box,
   said support member, when pivotally connected to the pedestal of a boat seat, being adapted to pivot on said first generally horizontal axis between a lowered position in which a tackle box mounted on the support member is adapted to rest on a supporting surface, such as a boat deck, and a raised position in which the tackle box is adapted to rest on the lap of a person sitting in said boat seat.

2. A tackle box holder as set forth in claim 1 wherein said mounting means comprises a cross member attached to said support member and extending generally parallel to said second axis, a pair of generally parallel arms extending from opposite ends of said cross member, and pivot means on the arms adapted for pivotally connecting the arms to opposite sides of the tackle box.

3. A tackle box holder as set forth in claim 1 wherein said connecting means comprises a bracket adapted to be clamped to the pedestal, said bracket having first and second mounting arms receiving said support member therebetween, and a pivot pin extending between said mounting arms and through said support member adjacent its fixed end, said support member being adapted to swing on said pivot pin.

4. A tackle box holder as set forth in claim 3 wherein said bracket further comprises locking means for releasably locking said support member in its raised and lowered positions and various positions of angular adjustment therebetween.

5. A tackle box holder as set forth in claim 4 wherein said locking means comprises a ratchet mechanism including a pair of ratchet members disposed in opposing relation on one mounting arm of the bracket and on the support member, said ratchet members having ratchet teeth thereon and being movable toward one another to bring the teeth on the ratchet members into locking interengagement to lock the support member in a selected angular position, and away from one another to move the teeth out of interengagement to permit the support member to be pivoted on said first generally horizontal axis.

6. A tackle box holder as set forth in claim 5 wherein said ratchet mechanism further comprises means for biasing said ratchet members toward one another.

7. A tackle box holder as set forth in claim 6 wherein said biasing means comprises a collar on said pivot shaft disposed between the support member and said second mounting arm, a head at one end of the pivot shaft adjacent the first mounting arm, and a spring around the pivot shaft disposed between said head and said first mounting arm.

8. A tackle box holder as set forth in claim 1 wherein said support member is extensible and retractable to vary the distance between said mounting means and the fixed end of the support member.

9. A tackle box holder as set forth in claim 8 further comprising spring means for urging said support member toward a retracted position whereby a tackle box mounted on the support member via said mounting means is adapted to be drawn against the lap of a person in the seat to stabilize the box.

10. A tackle box holder as set forth in claim 9 wherein said support member comprises a plurality of tubular sections having a telescopic interfit, and said spring means comprises a spring extending axially within said tubular sections, said spring being resiliently stretchable to permit limited extension of said sections relative to one another while resisting complete separation of said sections.

11. A tackle box holder as set forth in claim 10 wherein said means for pivotally connecting said fixed end of the support member to the pedestal comprises a bracket adapted to be clamped to the pedestal, said bracket including a pivot pin extending through one tubular section of the support member adjacent its fixed end for enabling the support member to be swung on said first horizontal axis, said spring being releasably connected at one end to said pivot pin and at its other end to a tubular section adjacent the outer end of the support member.

12. A tackle box holder as set forth in claim 1 in combination with a tackle box.

* * * * *